United States Patent [19]
Shonting et al.

[11] Patent Number: 5,676,576
[45] Date of Patent: Oct. 14, 1997

[54] SUBMARINE DEPLOYED SEA-STATE SENSOR

[75] Inventors: David Shonting, Middletown, R.I.; Jeffrey R. Knox, North Hampton, Mass.

[73] Assignee: The United States of America as represented by the Secretary of the Navy, Washington, D.C.

[21] Appl. No.: 701,336

[22] Filed: Aug. 22, 1996

[51] Int. Cl.[6] .......................... B63B 22/18; H04B 11/00
[52] U.S. Cl. ................................ 441/26; 441/1; 441/33; 73/170.034
[58] Field of Search .................... 441/1, 32, 33, 441/21–26; 73/170.34, 170.29, 170.31, 170.33

[56] References Cited

U.S. PATENT DOCUMENTS 4,794,575  12/1988  Miller ........................... 73/170.34

Primary Examiner—Ed Swinehart
Attorney, Agent, or Firm—Michael J. McGowan; Michael F. Oglo; Prithvi C. Lall

[57] ABSTRACT

A submarine deployed sea-state sensor includes an elongated housing having a nose cone and an aft end. The housing having a forward buoyant chamber for receiving an accelerometer and for causing the sensor to be buoyed up to the surface, where it will thereafter float in a spar buoy fashion. The housing has, aft of the buoyant chamber, a damping assembly including a longitudinally extending motion damping body, a communication link deployment subassembly and a lifting body, with both the damping assembly and the lifting body attached to a communication link interconnecting the accelerometer and a submerged platform so that, when the subassembly deploys a portion of the communication link between the lifting body and a submerged submarine and this portion of the communication line becomes taught, the lifting body is pulled from the housing and the motion damping body is pulled by the lifting buoy into a distended position from the main portion of the spar buoy. Initially, the motion damping body is telescoped in the housing by a sliding fit between the body and the housing, and the lifting body is releasably joined to the motion damping body by a detent. The distended portion of the motion damping body is defined by a fixed length strap arrangement disposed within the sensor's housing which is connected between the motion damping body and fixed structure located toward the top of the housing.

7 Claims, 5 Drawing Sheets

SUBMARINE DEPLOYED SEA-STATE SENSOR

STATEMENT OF GOVERNMENT INTEREST

The invention described herein may be manufactured by or for the Government of the United States of America for Governmental purposes without the payment of any royalties thereon or therefor.

BACKGROUND OF THE INVENTION

(1) Field of the Invention

The invention relates generally to the field of electronic sensing devices, and more particularly to sensors for sensing selected conditions on an ocean surface. The invention specifically provides a sensor which may be deployed by a submarine or other submerged platform, which can obtain wave statistics regarding significant wave height, mean and "rms" (root-mean-square) wave height, wave frequency spectra information, variance, the significance and mean period and sea state, from which conditions such as surface wind speed can be determined.

(2) Description of the Prior Art

It is often necessary for a platform such as a submarine submerged in, for example, an ocean environment, to determine wave conditions at the surface. Wave conditions can, for example, adversely effect launch of a missile. High-energy wave conditions can produce dynamic motions and pressure fluctuations which can perturb or damage slowly ascending missiles. Large waves can cause rolling motions which are transferred to the submarine, which can prevent safe launching of any missile system. In addition, whitecap turbulence of breaking waves can scatter and absorb sound energy used by sonar devices and the like which are used by torpedoes after launching. U.S. Pat. No. 4,794,575 describes a submarine-launched sea state buoy which can be deployed by a submerged platform for use in sensing surface conditions, such as wave amplitude and frequency. The buoy described in that patent includes a multi-chambered, buoyant cylindrical housing which houses an accelerometer and other electronic equipment. The buoy floats on the ocean surface and the accelerometer senses vertical acceleration of the buoy by the surface wave motion. The buoy includes a counterweight that operates to maintain the buoy in a predetermined orientation on the surface. A wire data link links the accelerometer and electronic equipment on the buoy to the submerged platform to provide data generated by the accelerometer and electronic equipment to the submerged platform. A predetermined time after deployment, the buoy will be scuttled by flooding.

There are a number of problems with the buoy as described in the '575 patent. For example, when the buoy is fully deployed, the data link can abrade on the edge of the buoy housing, which can interrupt data transmission. In addition, the buoy's motion damping means does not provide sufficient extension of mass of the body to sufficiently reduce pitch and roll. Further, scuttling of the buoy will prevent its re-use.

In copending U.S. patent application Ser. No. 08/591,183, filed 5 Apr. 1996 in the name of David Shonting, entitled Submarine Deployed Sea State Sensor (Navy Case No. 75829) assigned to the assignee of the present invention there is a description of a sea state sensor that solves a number of the problems inherent in the buoy described in the '575 patent. However, that sensor has a relatively large number of parts, and can be expensive to assemble.

SUMMARY OF THE INVENTION

It is therefore an object of the invention to provide a new and improved submarine-deployed sea state sensor.

In brief summary, a submarine deployed sea-state sensor comprising an elongated housing having a nose cone and an aft end, the housing having a forward buoyant chamber for receiving an accelerometer. The housing has, aft of the buoyant chamber, a damping assembly including a motion damping body, communication link deployment means and a lifting body, with both the damping assembly and the lifting body being attached to a communication link interconnecting the accelerometer and a submerged platform so that, when the portion of the communication link between the lifting body and the submerged platform becomes taught, the lifting body is pulled from the housing. The damping assembly and lifting body are releasably joined so that, when the lifting body is pulled from the housing, the lifting body pulls the damping assembly toward the aft end of the housing into a position in which at least a majority of the longitudinal expanse of the motion damping body is distended from the aft end of the housing.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DESCRIPTION OF THE PREFERRED EMBODIMENT

Figure 1:
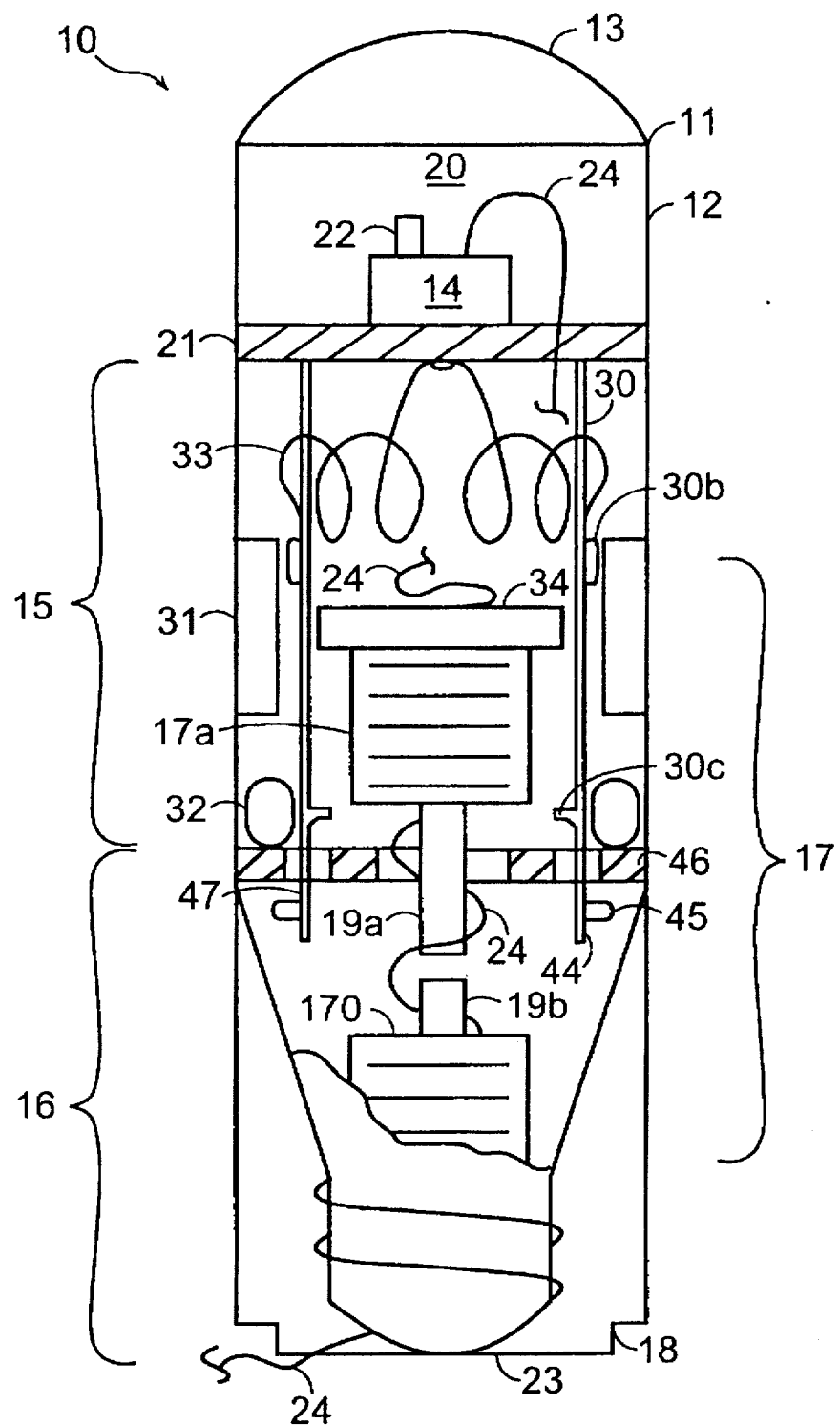
FIG. 1 is a mechanical schematic of a submarine deployed spar buoy-type sea state sensor constructed in accordance with the invention, it being understood that the depicted spar buoy configuration has an exaggerated diameter-to-longitudinal-length envelope.

FIG. 1 is a diagram, in schematic form, of a submarine deployed sea state sensor 10 constructed in accordance with the invention. With reference to FIG. 1, sensor 10 is effectively in the form of a spar buoy comprising a cylindrical housing 11 including a cylindrical sidewall 12 with a removable hemispherical nose cone 13. A restriction 18 is formed at the aft end 23 of the housing 11. The housing 11 houses a sealed electronics package 14 that includes conventional accelerometer and preliminary processing circuitry (not separately shown) that can detect acceleration as applied to the accelerometer and generate an output signal representative thereof for transmission to a deploying platform such as a submarine. The housing 11 also houses three other subsystems, namely, a damping assembly 15, a lifting body assembly 16, and a communication link dispensing assembly 17, the latter comprising a pair of helical coil and spool units 17a, 17b. Coil and spool units 17a, 17b respectively axially pay out communication link line upon increase of distance of separation of assemblies 15 and 16. Unit 17a is attached to assembly 15 and unit 17b is attached to assembly 16.

Generally, electronics package 14 is mounted in a sealed waterproof chamber 20 formed by the removable nose cone 13, a bulkhead 21 and a portion of the sidewall 12 between the nose cone 13 and the bulkhead. The nose cone 13 is removable so that, prior to deployment of the sensor 10, an operator can remove the nose cone, and activate the electronics package 14 by means of, for example, a switch 22. After activation, the operator can restore the nose cone to re-seal the chamber 20. In one embodiment, the nose cone 13 is threadably mounted on the sidewall 12 to form the chamber 20.

Once sensor 10 is launched, the portion thereof below bulkhead 21 becomes flooded with seawater through the aft open end of sidewall 12. To this end, the components of damping assembly 15 and of lifting body assembly are so constructed and arranged that, upon the sensor 10 being deployed in the ocean environment, quick flooding of the interior of sensor 10 up to bulkhead 21 occurs through the open aft end of housing 12. During storage prior to employment a removable cap (not shown) may be used to cover the aft end 23 of the housing 11.

As noted above, the housing 11 houses, in addition to the electronics package 14, three other subsystems, namely, a damping assembly 15, a lifting body assembly 16, and a communication link dispensing assembly 17. The damping assembly 15, after deployment, will help dampen pitch and roll of the sensor 10, that is, deviations of the sensor 10 from the vertical, and in addition can dampen motion due to high-frequency wave motion, so that the sensor 10 will primarily sense low-frequency motion reflecting to conditions that can affect missile launch.

Figure 2:
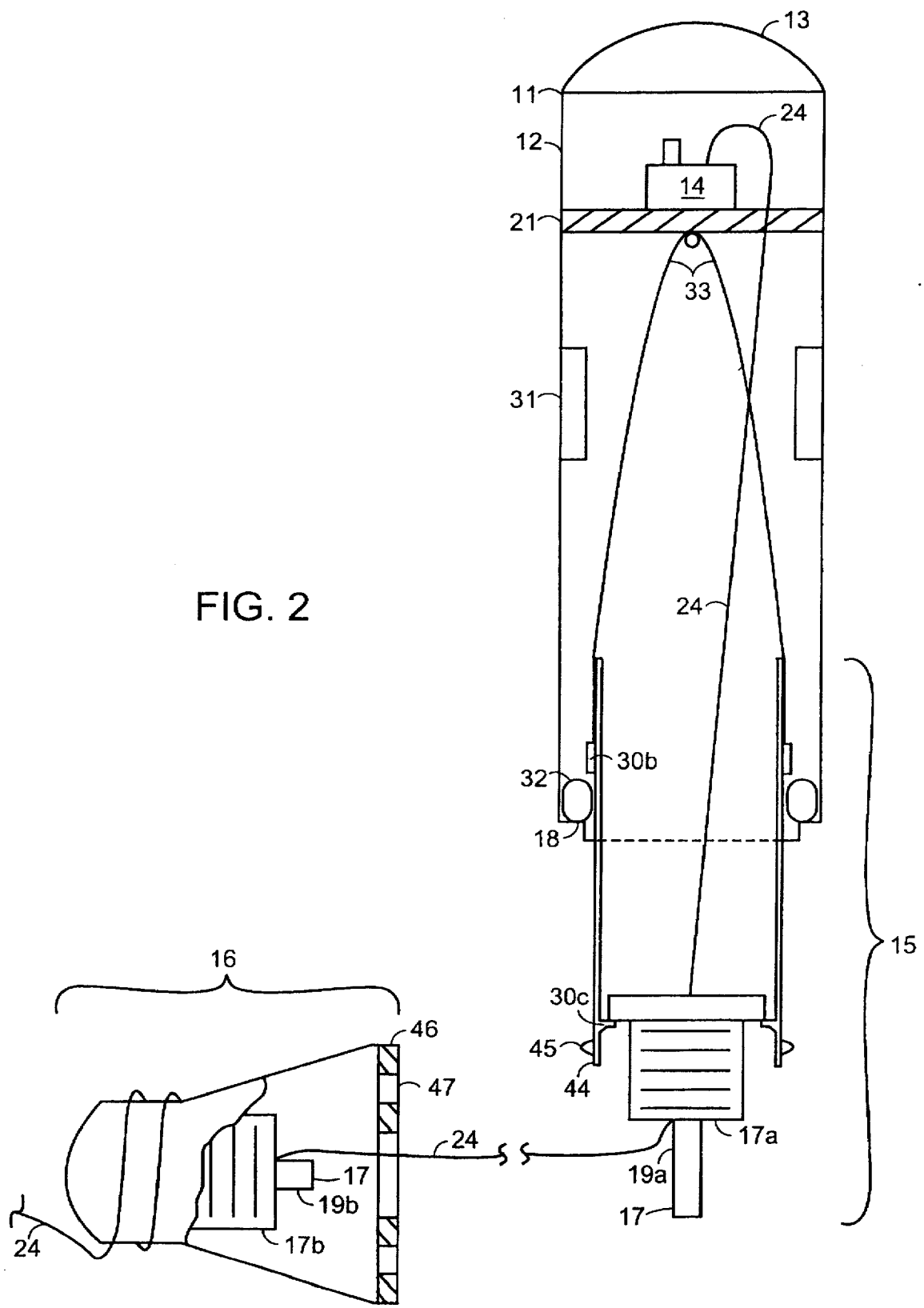
FIG. 2 is another mechanical schematic representing the sensor of FIG. 1, but in a state of its operation in which a motion damping assembly depends from the original longitudinal envelope of the sensor, and a lifting body assembly is separated from the spar buoy.
Figure 3:
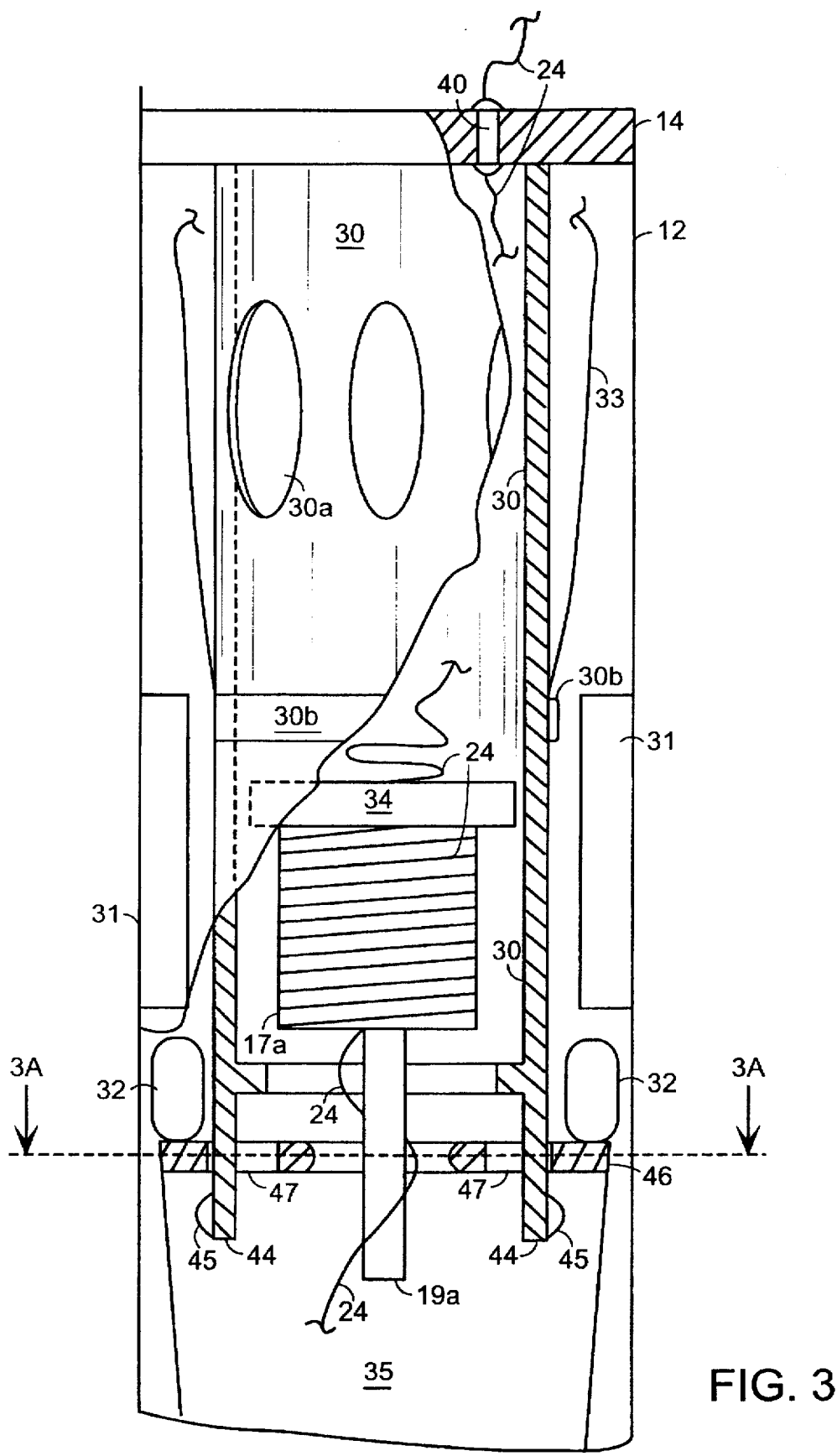
FIG. 3 is an enlarged detail representing a structural embodiment of the motion damping assembly located in the midsection of the sensor of FIG. 1, and which more particularly is in part a cutaway view depicting the side elevation of a first tier of internal components exposed, in part a cutaway view depicting the side elevation of a second more inwardly disposed tier of components, and in part a central section.

The damping assembly includes a cylindrical tube 30. A fixed spacer ring 31 is mounted to the interior bore of sidewall 12, in confronting relationship to tube 30. Suitable annular passages and perforations in transverse members, are provided to enable water to quickly move from the aft end of the sidewall and flood the interior of the sidewall up to bulkhead 21. Openings 30a, FIG. 3, are provided in tube 10 to enable its interior to quickly flood. A slip ring 32 is mounted around the tube 30 below the fixed spacer ring 31. A strap 33 affixes the tube 30 to the underside of the bulkhead 21. Referring to FIGS. 2 and 3, the midpoint of strap 33 is affixed to bulkhead 21 and its ends are fixedly bound to the outer periphery of tube 30 at a predetermined linear position between the ends of the tube, with the strap ends positioned at diametrically opposite positions about the tube. The strap ends are bound in these positions by means of a strip of plastic 30b which circumscribes and is cemented to tube 30. Coil and spool unit 17a is mounted within the lower end of the tube 30 via a support structure consisting of a transverse plate 34 which slidingly translates along the bore of tube 30, and is stopped from exiting the tube by collar 30c.

The sea state sensor device described in the above-identified copending Application, Ser. No. 08/591,183 includes a distending motion damping assembly comprising a three section telescoping members of a hard metal material such as stainless steel. In contrast, in accordance with the present invention the damping body is fabrication from a tube of substantially lighter weight material such as lucite. Therefore the center of buoyancy is higher reducing the response to high frequency waves (i.e., splashes).

The lifting body assembly 16 assists in deployment of both the damping assembly and the communication link 24 which connects the electronics package 14 to the deploying submarine (not shown). The lifting body assembly 16 includes a cylindrical body 35. Coil and spool unit 17b is mounted on the upper end of the cylindrical body 35. The communication link 24 is coupled bulkhead 21 via an insulation connector 40, FIG. 3 extends longitudinally through tube 30, is wound around units 17a and 17b, and is also wound around the cylindrical body 35. A pair of central pintles 19a, 19b are parts, respectively, of communication link coil and spool units 17a and 17b, and project from the aft and forward ends of these respective units. The pintles are so constructed and arranged to promote axial rather than lateral paying out of the communication link 24 under increase of distance of separation of assemblies 15 and 16.

Figure 3A:
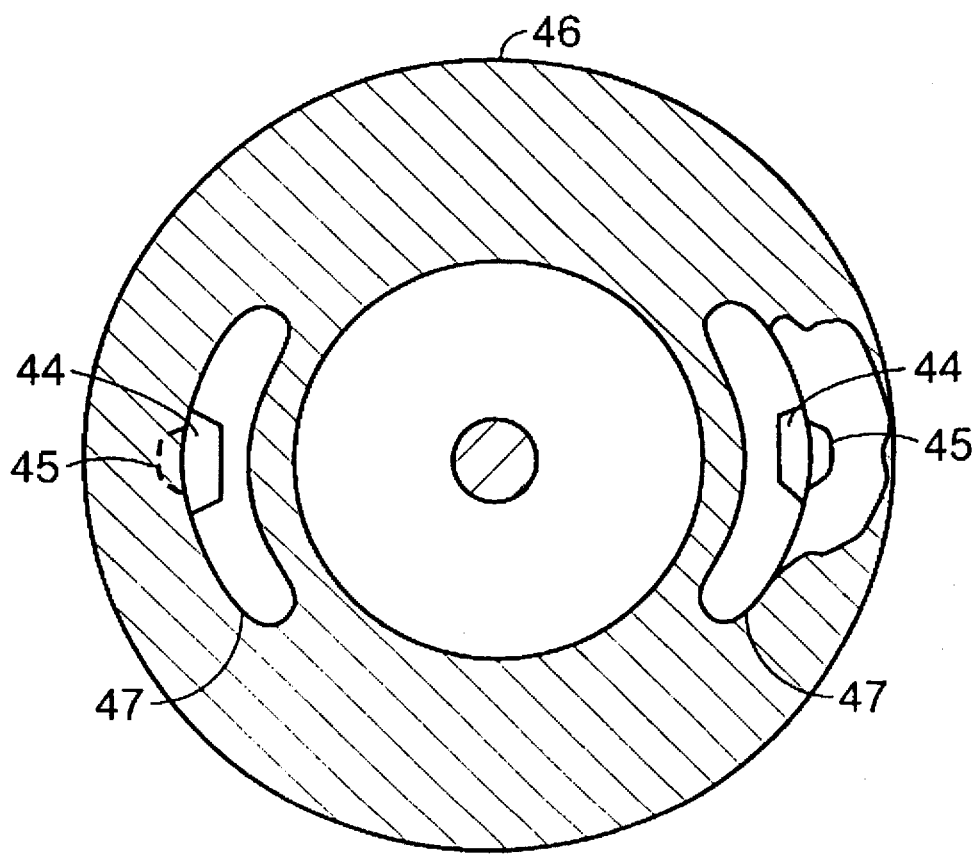
FIG. 3A is a section taken along lines 3A—3A, FIG. 3.

Tube 30 and cylindrical body 35 of lifting body assembly 16 are releasably joined by a detente arrangement shown in detail in FIGS. 3 and 3A. The detent arrangement 41 includes two or more downwardly-depending lugs 44 which resiliently deflect under a lateral force. In one successful embodiment, tube 30 is fabricated of lucite, and each lug 44 is formed as an extension of the main part of tube 30. A radially outwardly-projecting nib 45 is provided on each lug. The nibs may be formed, for example, as heads of round head screws driven into threaded holes formed in the lug.

Affixed within cylindrical body 35 is a transverse plate 46 with perforations 47 which are configured to receive the lugs 44, and which have sufficient radial expanse thickness that the nibs can pass therethrough. Tube 30 and cylindrical body 35 are releasably joined by insertion of the lugs 44 through the perforations 47. The radially outward peripheries of perforations 47 act as ridge members which, in cooperation with associated nib 45, provide a detent action that initially maintains body 35 joined to tube 30. A pulling force applied by communication line 24 from the submerged launch platform becoming taught will act upon lifting body 16, and in turn cause resilient lugs 44 to deflect so that the nibs will be able to pass through perforations 47. This allows damping motion assembly 15 and lifting body assembly 16 to separate. The resiliency characteristic of a wall of lucite tubing (out of which lugs 44 are formed) is suitable for providing this spring action.

The communication link 24 may be any convenient signal-carrying link, including electrical wires, optical fibers or the like.

Deployment of the sensor 10 will be described in connection with FIG. 1 and also FIG. 2, which depicts the sensor 10 in a deployed condition. With reference to those FIGS., immediately prior to deployment, the operator will remove the nose cone 13, use the switch 22 to activate the electronics package 14 and replace the nose cone 13 to seal the chamber 20. In addition, if the aft end 23 is covered by a cap for storage, the operator will remove the cap. In this initial off-the-shelf condition, tube 30 is retained in a telescoped relationship within housing 12 by a sliding fit provided by tube 30, slip ring 32 and the bore of housing 12, and the lifting body is releasably joined to tube 30 by the detent arrangement. Thereafter, the operator will eject the sensor 10 through a conventional aperture in the outer wall of the submarine into the ocean environment.

After ejection, the buoyancy provided by the sealed chamber 20 will cause the sensor 10 to rise toward the ocean surface. After the portion of the communication link 24 between the lifting body assembly 16 and the submarine becomes taught, the communication link 24 will exert a pulling force upon the detent arrangement, pulling the lifting body assembly 16 out of the aft end 23 (only FIG. 1) of the housing 11. The holding power of the detent assembly is overcome when, due to the inherent resilience of the material the tube is made of, the lugs 42 deflect inwardly allowing nibs 42 to pass over the ridge member formed by the outer radially edge of perforation 47. It will be appreciated that since this operation is based on the resilient flexibility of-lugs 44, the detent arrangement is effectively a spring-loaded release mechanism.

As the lifting body assembly 16 is drawn from the assembly, the damping 15 is pulled downwardly in the housing 11, by the pulling force of link 24 and by gravity force. The final position of tube 30 is defined by the predetermined distance which strap 33 permits tube 30 to travel, which distance is so chosen that a significant portion (but less than one-half) of the length of the tube 30 remains telescoped in housing 12. Slip ring 32 drops under the force of gravity and it abuts against inwardly directed collar-like restriction 18 at the aft end of housing 11. It will be appreciated that, when slip ring 32 is in this final position against restriction 18, it inhibits lateral motion between distended tube 30 and cylindrical sidewall 12. The inhibition of this lateral movement averts undesired pendulous oscillation of a sensor 10 in response to sea motion. Coil and spool unit 17a, which as stated earlier is slidingly mounted in the bore of tube 30, moves from an initial position in which it is telescoped within tube 30 to a distended position defined by abutment of transverse plate 34 against the inwardly directed collar 30c at the aft end of tube 30.

Figure 4:
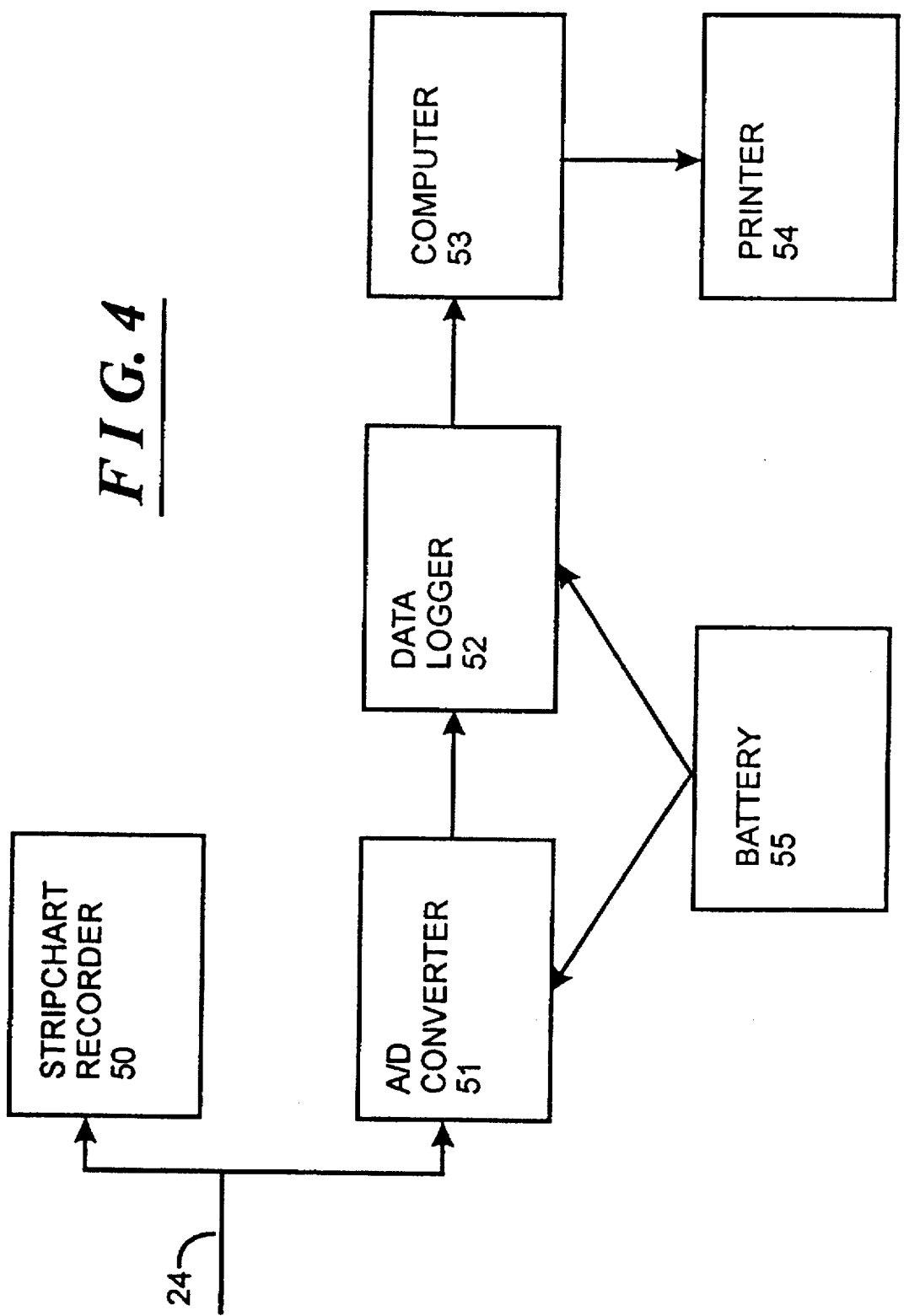
FIG. 4 is a functional block diagram depicting apparatus for processing signals received from the sea state sensor depicted in FIGS. 1 and 2.

After the sensor 10 reaches the ocean surface, the sensor can begin generating vertical acceleration data caused by wave motion on the buoyant chamber 20, for transmission over the communication link 24 to the submarine. It will be appreciated that the damping assembly 15, and more particularly tube 30, constitutes a motion damping body which will suppress pitching motion of sensor 10. This in turn enables sensor 10 to float on the surface in a more nearly stable attitude in which the signal being sent by sensor 10 to the linked submerged submarine will more faithfully represent the surface sea motion. The damping structure also functions to generally filter high-frequency acceleration components, which distort the desired sea state data. FIG. 4 depicts a functional block diagram depicting apparatus which may be used to process signals received from the sea state sensor depicted in FIGS. 1 and 2. With reference to FIG. 4, the communication link 24 is connected to a strip chart recorder 50, which can generate an analog recording of the signal received from the sensor as a function of time, and an analog to digital converter 51 which generates a digital data sequence representing the amplitude of the signal from the sensor at sequential points in time. A data logger 52 records the digital data for processing by a computer 53. A printer 54 may provide a hardcopy output from the computer. The analog to digital converter 51 and data logger 52 may be provided in the electronics package 14 on the sensor 10, and if so a battery 55 may be provided to power these elements.

As noted above, the computer 53 processes the digital data received from the sensor 10. It will be appreciated that, since the data received from the sensor 10 is acceleration data, and since acceleration is the second derivative of distance with respect to time, the ocean surface elevation information, or heave n(t) is obtained by integrating the acceleration data $a_z(t)$ twice with respect to time $$n(t) = \int a_z(t) dt dt \quad (1)$$

The frequency spectrum, which provides the distribution of energy content N(t) as a function of frequency F(a), is generated in a conventional manner using the FFT taken over a sampling period T as $$F(\omega) = \frac{1}{T} \int_{-T/2}^{T/2} n(t) e^{-i\omega t} dt, n = 0, +1, +2, \ldots \quad (2)$$

The energy spectrum, defined as $$_{-Fm}(\omega)\_^2 = \Phi_m(\omega) \quad (3)$$

is the contribution to the variance as a function of frequency. Since the acceleration applied by the wave motion is sinusoidal in nature, the integration in equation (1) will vary as $(1/a)^2$. The computer 53 applies corrections for estimates at low-frequencies, with the corrected estimate of the wave spectrum >(a) being related to the raw spectrum $>_m(a)$ in equation (3) by $$\Phi(\omega) = \frac{\Phi_m(\omega)}{R(\omega)H(\omega)} \quad (4)$$

where R(a) is a frequency-dependent function related to sensor and electronics characteristics, and H(a) is a frequency-dependent response function of the sensor 10 in the waves. These functions reflect non-linear sensor and wave effects at low and functions reflect non-linear sensor and wave effects at low and high frequencies.

The invention provides a number of advantages. In particular, the damping assembly 15 and lifting body assembly 16 cooperate to ensure that the communication link 24 does not abrade on the housing 11 when the sensor 10 is deployed. In addition, the damping assembly 15 ensures that the sensor will maintain a vertical position, and acts to filter high-frequency accelerations which the sensor 10 is to ignore.

The preceding description has been limited to a specific embodiment of this invention. It will be apparent, however, that variations and modifications may be made to the invention, with the attainment of some or all of the advantages of the invention. Therefore, it is the object of the appended claims to cover all such variations and modifications am come within the true spirit and scope of the invention.

What is claimed is:

1. A system for deploying a sea-state sensor from a submerged submarine comprising:

an elongated housing having a nose cone and an aft end, the housing having a forward buoyant instrumentation chamber containing an accelerometer;

the housing further having, aft of the buoyant instrumentation chamber, a damping assembly including a motion damping body, communication link deployment means and a lifting body, with both the damping assembly and the lifting body being attached to a communication link interconnecting the accelerometer and a submerged submarine so that, when the portion of the communication link between the lifting body and the submerged submarine becomes taught, the lifting body is pulled from the housing; and the damping assembly and lifting body being releasably joined so that, when the lifting body is pulled from the housing, the lifting body pulls the damping assembly toward the aft end of the housing into a position in which at least a majority of the longitudinal expanse of the motion damping body is distended from the aft end of the housing.

2. A system as defined in claim 1 wherein said elongated housing is cylindrical, in which the motion damping body comprises a tube initially in telescoped relation within the housing and adapted to slidingly move to said position in which at least a majority of its expanse is distended.

3. A system as defined in claim 2 wherein said damping body tube, said communication link deployment means, and said lifting body are so constructed and arranged that the damping body tube becomes quickly flooded upon deployment of the sensor from the submarine into the ocean environment, whereby when the tube is moved into said position in which at least a majority of its expanse is distended, the tube and the water therein act as a virtual mass to enhance motion damping.

4. A system as defined in claim 2 wherein:
   said forward buoyant instrumentation chamber is so constructed and arranged that the aft end thereof forms a transversely extending aft wall; and
   said damping body tube is affixed to the exterior surface of the aft wall of the buoyant instrumentation chamber by a flexible strap means, the unfolded longitudinal expanse of the strap means between the buoyant chamber and where the strap means is attached to the damping body tube defining said position in which at least a majority of its expanse is distended.

5. A system as defined in claim 2 wherein said lifting body has a housing Shaped as a body of revolution about the longitudinal axis of the sensor and wherein the damping assembly and lifting body are releasably joined by a detent, said detent including an aftwardly extending lug member extending from the end of the damping body tube, said lug member carrying a radially outwardly extending nib, and a confronting radially inwardly extending ridge member formed on the interior of the housing of the lifting body at the front end thereof.

6. A system as defined in claim 5 wherein the ridge member is rigid and the lug member is made of a material which exhibits a resilient flexibility characteristic such that the nib and the ridge cooperate as a spring-loaded release mechanism.

7. A system as defined in claim 2 and:
   a lateral motion constraining ring slidably mounted between the interior wall of said cylindrical sensor housing and the motion damping body tube;
   a radially inwardly directed collar formed at the aft end of said cylindrical sensor housing; and
   when the motion damping body tube is in said position in which at least a majority of its expanse is distended, said lateral motion constraining spacer ring is abutted against said collar at the aft end of the cylindrical sensor housing, whereby the fit between the tube and the housing inhibits lateral movement between the distended tube and the housing.

* * * * *